(12) United States Patent
Nakada

(10) Patent No.: US 6,357,294 B1
(45) Date of Patent: Mar. 19, 2002

(54) THERMAL AIR FLOW SENSOR

(75) Inventor: Keiichi Nakada, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/253,945

(22) Filed: Feb. 22, 1999

(30) Foreign Application Priority Data

Feb. 23, 1998 (JP) .......................................... 10-040226

(51) Int. Cl.[7] ............................................... G01F 1/68
(52) U.S. Cl. .................................................. 73/204.26
(58) Field of Search ..................... 73/204.26, 204.25, 73/204.23, 204.22, 204.11; 338/308, 25, 22 R; 257/412, 413, 755

(56) References Cited

U.S. PATENT DOCUMENTS

| | | | |
|---|---|---|---|
| 4,276,557 A | * 6/1981 | Levinstein et al. | 257/755 |
| 4,450,620 A | * 5/1984 | Fuls et al. | 257/413 |
| 4,612,258 A | * 9/1986 | Tsang | 257/413 |
| 4,770,036 A | * 9/1988 | Porth et al. | 338/308 |
| 4,888,988 A | * 12/1989 | Lee et al. | 73/204.26 |
| 4,908,679 A | * 3/1990 | Vora et al. | 257/755 |
| 5,006,421 A | * 4/1991 | Yang et al. | 338/308 |
| 5,243,858 A | * 9/1993 | Erskine et al. | 73/204.26 |
| 5,393,351 A | * 2/1995 | Kinard et al. | 73/204.26 |
| 5,703,287 A | * 12/1997 | Treutler et al. | 73/204.26 |
| 6,101,872 A | * 8/2000 | Zechnall et al. | 73/204.26 |

FOREIGN PATENT DOCUMENTS

| | | |
|---|---|---|
| JP | 8-54269 | 2/1996 |
| WO | WO 8905963 | 6/1989 |
| WO | WO 9003650 | 8/1999 |

* cited by examiner

Primary Examiner—Harshad Patel
(74) Attorney, Agent, or Firm—Crowell & Moring LLP

(57) ABSTRACT

Disclosed is a thermal air flow sensor in which polycrystalline silicon is used as a heat generating resistor, and which has improved detection sensitivity. An upstream heat generating resistor, a downstream heat generating resistor, a temperature measuring resistor, and an air temperature measuring resistor are formed on a silicon substrate. These resistors are each formed of a semiconductor thin film in which polycrystalline silicon is mixed with a silicide compound and which contains an impurity doped therein. The formed resistor has small specific resistance and a large resistance temperature coefficient.

9 Claims, 5 Drawing Sheets

THERMAL AIR FLOW SENSOR

BACKGROUND OF THE INVENTION

1. Field of the Invention

The present invention relates to a thermal air flow sensor, and more particularly to a thermal air flow sensor suitable for measuring a flow rate of intake air in internal combustion engines.

2. Description of the Related Art

Heretofore, as thermal air flow sensors which are provided in intake passages of internal combustion engines for automobiles etc. to measure flow rates of intake air, thermal type sensors have been primarily employed because they can detect a mass flow directly. Of those thermal air flow sensors, attention has been recently focused on one that is fabricated on a semiconductor substrate of silicon (Si), for example, by using the semiconductor microprocessing techniques. The reason is that such a sensor is economical because it can be mass-produced relatively easily, has a small size and can be driven with low power. Materials of heat generating resistors and temperature measuring resistors formed on semiconductor substrates are generally metallic materials such as platinum (Pt), gold (Au), copper (Cu), aluminum (Al), chromium (Cr), nickel (Ni) and tungsten (W), for example.

As disclosed in JP-A-8-54269, for example, it is also known to employ polycrystalline silicon (Poly-Si) as materials of heat generating resistors and temperature measuring resistors formed on semiconductor substrates. Using polycrystalline silicon as resistor materials provides such advantages that the existing semiconductor manufacturing process can be employed as it is, that a specific resistance value can be controlled by controlling an impurity density, and that polycrystalline silicon has good adhesion with silicon dioxide ($SiO_2$) and silicon nitride ($Si_3N_4$) which serve as protective films.

However, specific resistance of polycrystalline silicon itself is so large that the polycrystalline silicon cannot be in itself used as a heat generating resistor for measuring a flow rate of air. For this reason, as disclosed in the above-cited JP-A-8-54269, specific resistance of polycrystalline silicon is reduced by doping an impurity in the polycrystalline silicon.

Doping an impurity in polycrystalline silicon however reduces not only the specific resistance, but also the resistance temperature coefficient. Since a thermal air flow sensor measures a flow rate of intake air based on an amount of heat taken away by the intake air, a large resistance temperature coefficient is required to increase detection sensitivity. In a conventional thermal air flow sensor using a platinum wire, for example, the platinum wire has a resistance temperature coefficient of 3700 ppm/K. On the other hand, it was found that when polycrystalline silicon was doped with an impurity element to such an extent as causing the impurity density to saturate, its resistance temperature coefficient lowered down to below 1200 ppm/K. Such a lowering of the resistance temperature coefficient raised a problem of reducing the detection sensitivity of a thermal air flow sensor and rendering the sensor not practical in use.

SUMMARY OF THE INVENTION

An object of the present invention is to provide a thermal air flow sensor in which polycrystalline silicon is used as a heat generating resistor, and which has improved detection sensitivity.

(1) To achieve the above object, the present invention provides a thermal air flow sensor including a heat generating resistor formed on a substrate, wherein the heat generating resistor is formed of a semiconductor thin film in which polycrystalline silicon is mixed with a silicide compound.

With that feature, specific resistance of the heat generating resistor can be reduced without lowering its resistance temperature coefficient. As a result, the sensor has improved detection sensitivity.

(2) In the above sensor of (1), preferably, a metal forming the silicide compound contains at least one of molybdenum (Mo), tantalum (Ta), tungsten (W) and titanium (Ti).

(3) In the above sensor of (1), preferably, the semiconductor thin film contains an impurity element doped therein.

With that feature, it is possible to further reduce the sensitivity.

(4) In the above sensor of (3), preferably, an impurity is doped in the semiconductor thin film so that the semiconductor thin film has a resistance temperature coefficient of not less than 1200 ppm/K and specific resistance of 1 to 10 $\Omega/\square$ in terms of sheet resistance.

With that feature, the resistance temperature coefficient can be increased while reducing the specific resistance, thus resulting in improved detection sensitivity.

(5) In the above sensor of (1), preferably, lead wires are directly connected by wire bonding to leads which are connected to the heat generating resistor and are made of the same material as the heat generating resistor.

With that feature, the number of manufacturing steps can be cut down.

DESCRIPTION OF THE PREFERRED EMBODIMENTS

A thermal air flow sensor according to a first embodiment of the present invention will be described below with reference to FIGS. 1 to 5.

The structure of the thermal air flow sensor according to the first embodiment of the present invention will be first described with reference to FIGS. 1 and 2.

Figure 1:
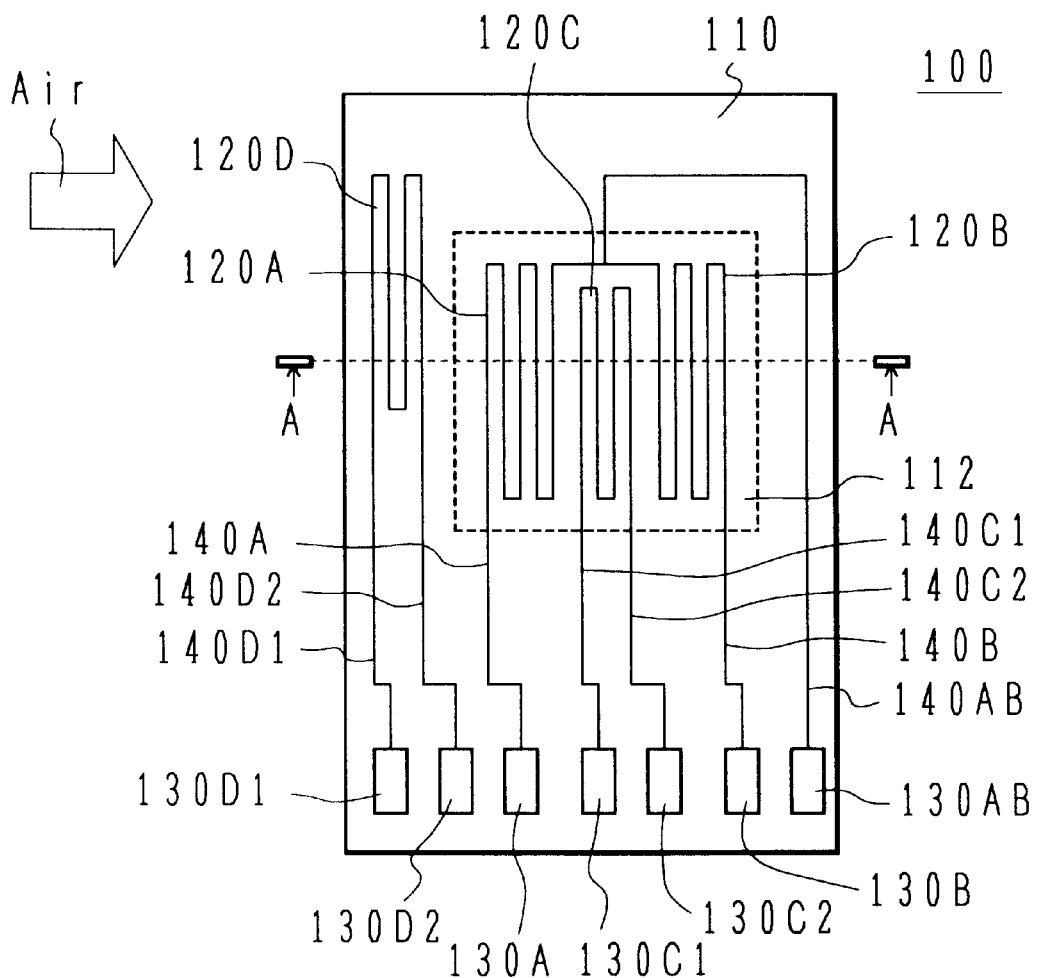
FIG. 1 is a plan view of a thermal air flow sensor according to a first embodiment of the present invention.
Figure 2:
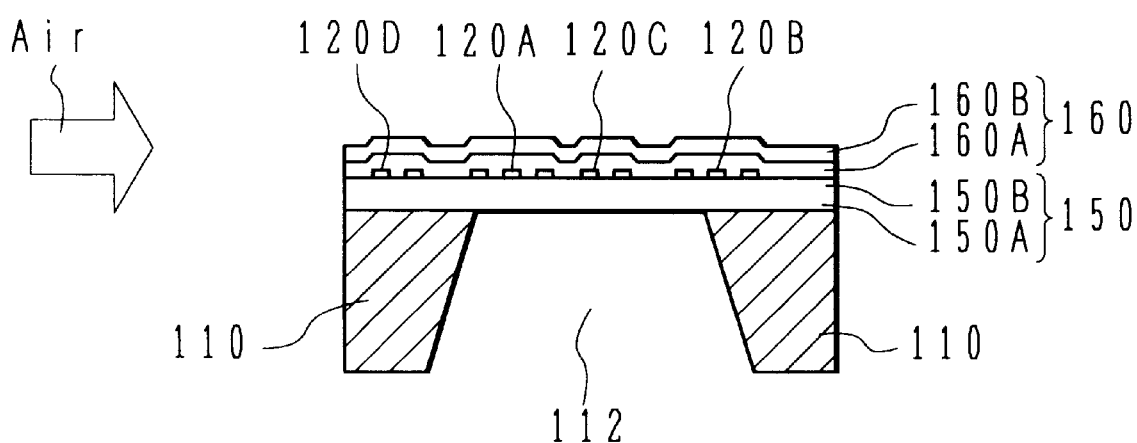
FIG. 2 is a sectional view taken along the line A—A of FIG. 1.

FIG. 1 is a plan view of the thermal air flow sensor according to the first embodiment of the present invention, and FIG. 2 is a sectional view taken along the line A—A of FIG. 1.

A thermal air flow sensor 100 according to this embodiment comprises an upstream heat generating resistor 120A, a downstream heat generating resistor 120B, a temperature measuring resistor 120C, and an air temperature measuring resistor 120D, these resistors being all formed on substrate 110. The upstream heat generating resistor 120A is disposed on the upstream side in the (forward) direction of an intake air stream Air, and the downstream heat generating resistor 120B is disposed downstream of the upstream heat generating resistor 120A. The temperature measuring resistor 120C detects a temperature defined by the heat generating resistors 120A and 120B. The air temperature measuring resistor 120D measures a temperature of intake air. The silicon substrate 110 has such a small size that the short side is about 2 mm and the long side is about 6 mm, for example, in an illustrated shape.

As described later with reference to FIG. 2, the upstream heat generating resistor 120A, the downstream heat generating resistor 120B, and the temperature measuring resistor 120C are formed above a cavity 112 which is formed in the silicon substrate 110.

Terminal electrodes 130A, 130AB, 130B, 130C1, 130C2, 130D1 and 130D2 are formed in an end portion of the silicon substrate 110. One end of the upstream heat generating resistor 120A is connected to the terminal electrode 130A through a lead 140A. A junction between the upstream heat generating resistor 120A and the downstream heat generating resistor 120B is connected to the terminal electrode 130AB through a lead 140AB. One end of the downstream heat generating resistor 120B is connected to the terminal electrode 130B through a lead 140B. Both ends of the temperature measuring resistor 120C are connected to the terminal electrodes 130C1 and 130C2 through leads 140C1 and 140C2, respectively. Both ends of the air temperature measuring resistor 120D are connected to the terminal electrodes 130D1 and 130D2 through leads 140D1 and 140D2, respectively.

Here, the upstream heat generating resistor 120A, the downstream heat generating resistor 120B, the temperature measuring resistor 120C, and the air temperature measuring resistor 120D are each formed of a semiconductor thin film in which polycrystalline silicon (Poly-Si) is mixed with a silicide compound ($WSi_2$) of silicon (Si) and tungsten (W), and which contains phosphorous (P) doped therein as an impurity By using, as each resistor 120, a semiconductor thin film in which polycrystalline silicon is mixed with a silicide compound, specific resistance of the resistor 120 can be reduced to become smaller than that resulted when using polycrystalline silicon alone, while a reduction in resistance temperature coefficient thereof can be held down. To further reduce the specific resistance, phosphorous is doped as an impurity in the semiconductor thin film in which polycrystalline silicon is mixed with a silicide compound. However, an increase in impurity density lowers not only the specific resistance, but also the resistance temperature coefficient. Accordingly, the impurity density is adjusted depending on required values of the specific resistance and the resistance temperature coefficient.

The upstream heat generating resistor 120A and the downstream heat generating resistor 120B are formed to have a film thickness of 0.5 $\mu$m, a line width of 100 $\mu$m, and a length of 1.1 mm. On these conditions, a sheet resistance value of 2 $\Omega/\square$ and a resistance value of 50$\Omega$ are resulted, and the resistance temperature coefficient can be increased to 2000 ppm/K.

Also, the temperature measuring resistor 120C and the air temperature measuring resistor 120D are formed to have a film thickness of 0.5 $\mu$m, a line width of 10 $\mu$m, and a length of 2 mm. On these conditions, a sheet resistance value of 2 $\Omega/\square$ and a resistance value of 900$\Omega$ are resulted, and the resistance temperature coefficient can be increased to 2000 ppm/K.

By properly selecting a mixing ratio of a silicide compound to polycrystalline silicon and an impurity density, the heat generating resistors 120A, 120B can be each formed to have a sheet resistance value of 1 to 10 $\Omega/\square$, preferably 1 to 3 $\Omega/\square$, and a resistance value of 50 $\Omega$ to several hundreds $\Omega$. On these conditions, the resistance temperature coefficient is set to be not less than 1200 ppm/K.

In addition to a silicide compound ($WSi_2$) of silicon (Si) and tungsten (W), the silicide compound may be any of a silicide compound ($MoSi_2$) of silicon (Si) and molybdenum (Mo), a silicide compound ($TaSi_2$) of silicon (Si) and tantalum (Ta), and a silicide compound ($TiSi_2$) of silicon (Si) and titanium (Ti).

Further, in addition to phosphorous (P), boron (B), arsenic (As) and antimony (Sb) are also usable as an impurity to be doped in the semiconductor thin film in which polycrystalline silicon is mixed with a silicide compound.

As with the resistor 120, the leads 140A, 140AB, 140B, 140C1, 140C2, 140D1 and 140D2 are each formed of a semiconductor thin film in which polycrystalline silicon is mixed with a silicide compound and which contains an impurity doped therein. Each lead 140 has a line width larger than (ten or more times as thick as) that of the resistor 120 so that its resistance value is small.

The principles of the thermal air flow sensor according to this embodiment for detecting a flow rate of intake air will now be described.

The upstream heat generating resistor 120A and the downstream heat generating resistor 120B are supplied with a heating current through the terminal electrodes 130A and 130B, and then generate heat. A temperature (Th) defined by the upstream heat generating resistor 120A and the downstream heat generating resistor 120B is detected by the temperature measuring resistor 120C disposed close to those resistors 120A, 120B. On the other hand, a temperature (Ta) of intake air flowing into an intake passage is detected by the air temperature measuring resistor 120D. Then, the heating current supplied to the heat generating resistors 120A, 120B is controlled so that the temperature (Th) defined by the heat generating resistors 120A, 120B is held higher than the temperature (Ta) of the intake air by a predetermined temperature $\Delta Th$ (e.g., 150° C.). An amount of heat taken away from the heat generating resistors 120A, 120B is proportional to a flow rate of intake air, and hence a value of the heating current supplied for heating the heat generating resistors 120A, 120B corresponds to the flow rate of the intake air. As a result, the flow rate of the intake air can be measured from the value of the heating current.

Next, the principles of the thermal air flow sensor according to this embodiment for detecting the direction of the air stream Air will be described.

When the flow rate of the air stream Air is zero, no temperature difference occurs between the upstream heat generating resistor 120A and the downstream heat generating resistor 120B. On the other hand, when the air stream Air flows in the (forward) direction as shown, the air stream Air develops a greater cooling effect on the upstream heat generating resistor 120A than on the downstream heat generating resistor 120B. Also, since the upstream and downstream heat generating resistors 120A, 120B are connected in series and the same heating current flows therethrough, both the resistors 120A, 120B generate heat in the same amount. This results in that the temperature of the upstream heat generating resistor 120A is lower than that of the downstream heat generating resistor 120B. By contrast, when the air stream Air flows in the (backward) direction opposed to the illustrated direction, the air stream Air develops a greater cooling effect on the downstream heat generating resistor 120B than on the upstream heat generating resistor 120A, and the temperature of the downstream heat generating resistor 120B becomes lower than that of the upstream heat generating resistor 120A on the contrary to the above case.

Accordingly, the direction of the air stream can be detected by comparing a voltage across the upstream heat generating resistor 120A (i.e., a voltage between the terminal electrodes 130A and 130AB) with a voltage across the downstream heat generating resistor 120B (i.e., a voltage between the terminal electrodes 130B and 130AB), and then comparing temperatures (resistance values) of both the resistors with each other.

The sectional structure of the thermal air flow sensor 100 according to this embodiment will now be described with reference to FIG. 2. FIG. 2 shows a section taken along the line A—A of FIG. 1.

On the silicon substrate 110, there is formed an electrically insulating film 150 which comprises a silicon dioxide ($SiO_2$) layer 150A and a silicon nitride ($Si_3N_4$) layer 150B laminated in this order. The silicon dioxide layer 150A has a coefficient of thermal expansion as small as about 1/10 time that of the silicon nitride layer 150B. For this reason, the silicon nitride layer 150B, which has a coefficient of thermal expansion slightly larger than that of the silicon substrate 110 and a high mechanical strength, is employed to reduce thermal stress between the silicon substrate 110 and the electrically insulating film 150, thereby increasing the mechanical strength.

On the silicon nitride layer 150B, there are formed the resistors 120A, 120B, 120C and 120D each comprising, as described above, a semiconductor thin film in which polycrystalline silicon is mixed with a silicide compound and which contains an impurity doped therein.

On those resistors 120, there is formed a protective film 160 which comprises a silicon dioxide ($SiO_2$) layer 160A and a silicon nitride ($Si_3N_4$) layer 160B laminated in this order. The protective film 160 is formed to protect the resistors 120 against foreign matters, such as oil and water, contained in the intake air.

Further, a cavity 112 is formed in a central portion of the silicon substrate 110 to cover an area locating under the heat generating resistors 120A, 120B and the temperature measuring resistor 120C. The cavity 112 is formed by anisotropic etching of the silicon substrate 110 to such an extent that it reaches the boundary surface between the silicon substrate 110 and the electrically insulating film 150. Forming the cavity 112 provides such a structure that the heat generating resistors 120A, 120B and the temperature measuring resistor 120C are supported by the electrically insulating film 150 and the protective film 160, and are thermally insulated by the presence of the cavity 112. Comparing with the case that the cavity 112 is filled by the silicon substrate, therefore, the heat capacity of a sensor portion, which is made up of the heat generating resistors 120A, 120B and the temperature measuring resistor 120C and serves to measure a flow rate of intake air, can be reduced; hence response of the thermal air flow sensor can be improved.

The manufacturing process of the thermal air flow sensor according to this embodiment will now be described with reference to FIG. 2.

On the silicon substrate 110, the electrically insulating film 150 is first formed as follows. The silicon dioxide layer 150A is formed in a thickness of about 0.5 $\mu$m by the process of thermal oxidation or CVD (Chemical Vapor Deposition), for example. Thereafter, the silicon nitride layer 150B is formed in a thickness of about 0.2 $\mu$m by the CVD process, for example.

Then, to form the resistors 120, a semiconductor thin film, in which polycrystalline silicon is mixed with a silicide compound, is formed in a thickness of about 0.5 $\mu$m by the CVD process, for example. Further, phosphorus is doped as an impurity element in the semiconductor thin film by thermal diffusion or ion implantation. After that, a resist is formed in a predetermined shape by the known photolithography technique, and the semiconductor thin film is patterned by the process of reactive ion etching, for example. The resistors 120A, 120B, 120C and 120D are thereby formed.

Then, after forming the terminal electrodes 130 of aluminum, the protective film 160 is formed in areas except for the terminal electrodes 130 as follows. The silicon dioxide layer 160A is formed in a thickness of about 0.5 $\mu$m by the process of thermal oxidation or CVD, for example. Thereafter, the silicon nitride layer 160B is formed in a thickness of about 0.2 $\mu$m by the CVD process, for example.

Finally, the cavity 112 is formed by anisotropic etching from the rear surface of the silicon substrate 110 with silicone dioxide used as a mask material. The thermal air flow sensor 100 is then obtained by dicing the silicon substrate 110.

In the thermal air flow sensor according to this embodiment, the resistance value of each heat generating resistor is preferably in the range of 50$\Omega$ to several hundreds $\Omega$. The semiconductor thin film, in which polycrystalline silicon is mixed with a silicide compound and which is employed as materials of the resistors 120A, 120B, 120C and 120D in this embodiment, has sufficiently small specific resistance, and its sheet resistance value is on the order of about 1 to 3 $\Omega/\square$. Accordingly, the amount of an impurity doped can be held down, and the resistance temperature coefficient can be obtained as a satisfactory value larger than 1200 ppm/K that is obtained in the case of using polycrystalline silicon alone. As a result, a desired large resistance temperature coefficient and small specific resistance enough to achieve the object can be both attained.

The construction of an air flowmeter including the thermal air flow sensor according to this embodiment will now be described with reference to FIGS. 3 to 5.

Figure 3:
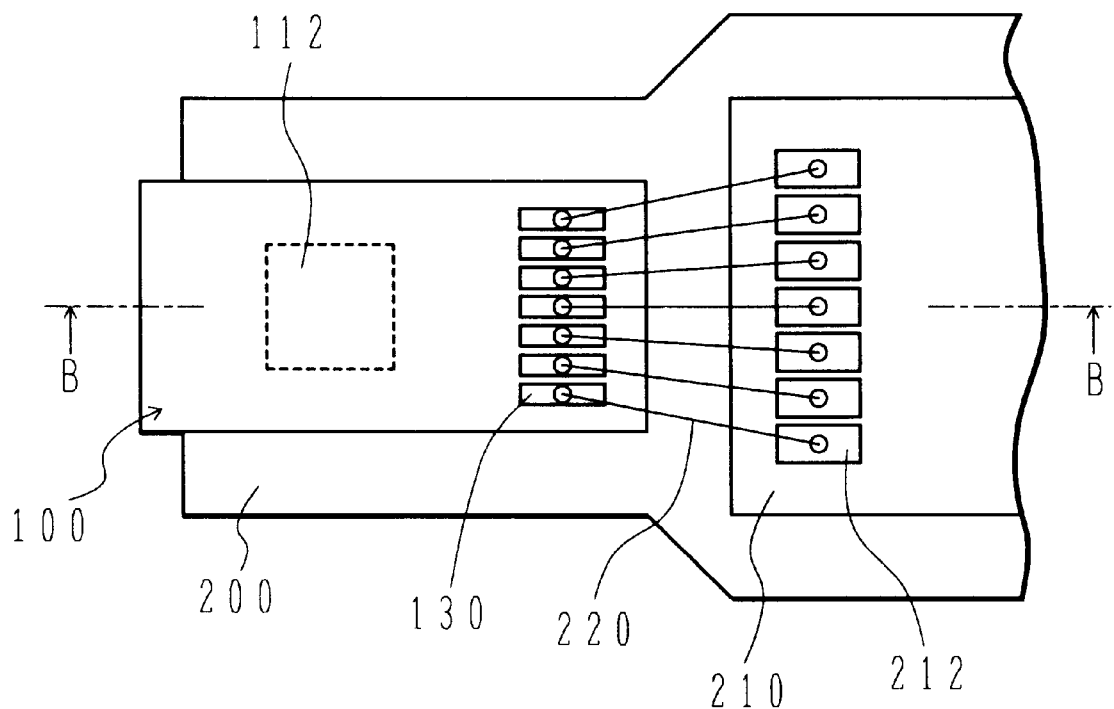
FIG. 3 is a partial plan view of an air flowmeter including the thermal air flow sensor according to the first embodiment of the present invention.
Figure 4:
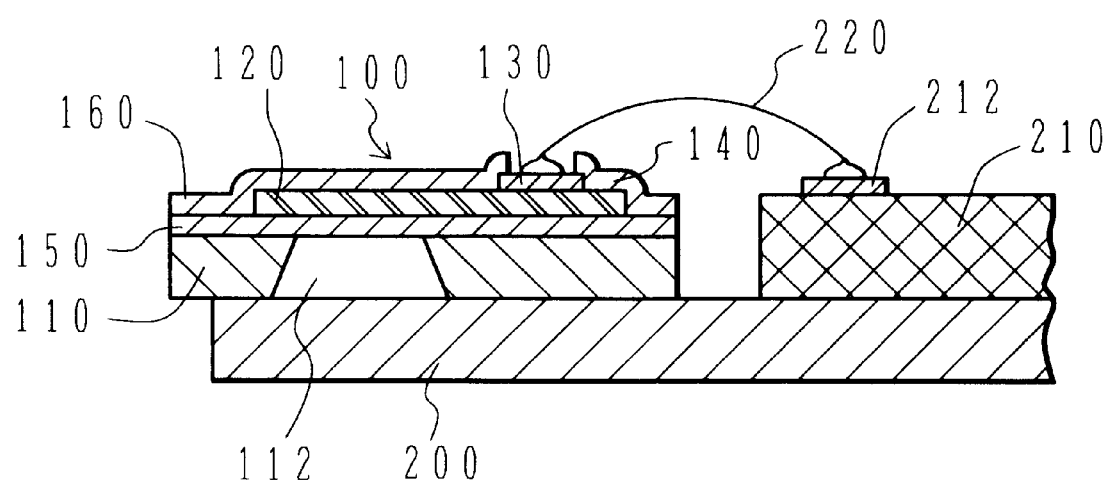
FIG. 4 is a sectional view taken along the line B—B of FIG. 3.
Figure 5:
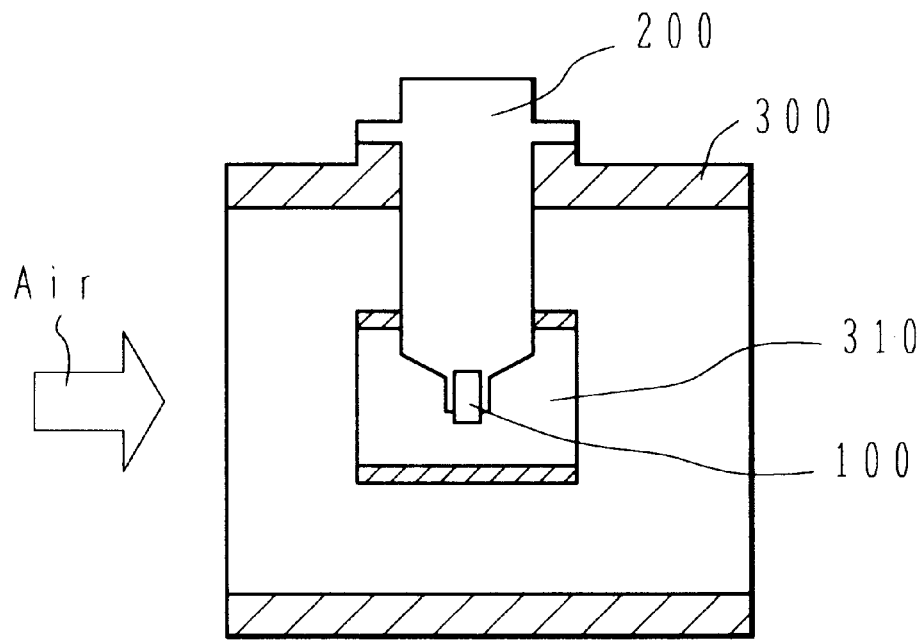
FIG. 5 is an explanatory view showing a state where the air flowmeter including the thermal air flow sensor according to the first embodiment of the present invention is attached to an intake passage.

FIG. 3 is a partial plan view of the air flowmeter including the thermal air flow sensor according to the first embodiment of the present invention, FIG. 4 is a sectional view taken along the line B—B of FIG. 3, and FIG. 5 is an explanatory view showing a state where the air flowmeter including the thermal air flow sensor according to the first embodiment of the present invention is attached to an intake passage.

As shown in FIG. 3, the thermal air flow sensor 100 and a signal processing circuit 210 are fixed on a support 200. The plurality of terminal electrodes 130 of the thermal air flow sensor 100 are connected respectively to a plurality of terminal electrodes 212 of the signal processing circuit 210 by wire bonding using lead wires 220, e.g., gold wires. The signal processing circuit 210 is formed on an electrically insulating substrate made of alumina, for example.

As shown in FIG. 4, the thermal air flow sensor 100 is mounted such that the silicon substrate 100 is fixed to the support 200 and the cavity 112 is positioned to face the support 200. The resistors 120 are exposed at their surfaces to air through the protective film 160. The plurality of terminal electrodes 130 of the thermal air flow sensor 100 are connected respectively to the plurality of terminal electrodes 212 of the signal processing circuit 210 by wire bonding using the lead wires 220, e.g., gold wires. The terminal electrodes 130 are formed using aluminum (Al) or gold (Au) on end portion surfaces of the leads 140 connected to the resistors 120.

Then, as shown in FIG. 5, the support 200 including the thermal air flow sensor 100 fixed thereon is fixedly installed such that the thermal air flow sensor 100 locates in a sub-passage 310 provided within an intake passage 300.

When the thermal air flow sensor is installed in the intake passages 300 of an internal combustion engine for automobiles or the like, intake air usually flows in the direction (forward direction from an air cleaner toward an engine) of the air stream Air illustrated. Depending on operating conditions of the internal combustion engine, however, intake air may flow in the (backward) direction opposed to the illustrated air stream Air. In view of such a situation, the direction detecting function described above is of great importance.

With this embodiment, as described above, by using polycrystalline silicon as a heat generating resistor, the existing semiconductor manufacturing process can be employed as it is. Also, by mixing a silicide compound in polycrystalline silicon, specific resistance of the heat generating resistor can be reduced. In addition, by doping an impurity to further reduce the specific resistance, detection sensitivity of the sensor can be improved.

Next, the structure of a thermal air flow sensor according to a second embodiment of the present invention will be described with reference to FIG. 6.

Figure 6:
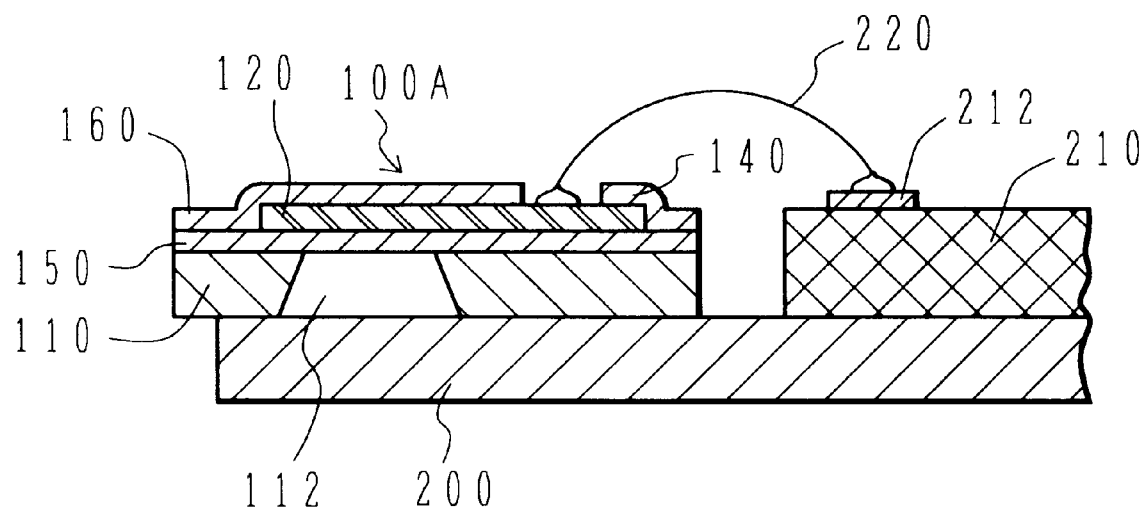
FIG. 6 is a sectional view showing the structure of a thermal air flow sensor according to a second embodiment of the present invention.

FIG. 6 is a sectional view showing the structure of the thermal air flow sensor according to the second embodiment of the present invention. Note that the same symbols as those in FIG. 4 denote the same components.

As with the sensor described above in connection with FIG. 1, a thermal air flow sensor 100A according to this second embodiment comprises an upstream heat generating resistor 120A, a downstream heat generating resistor 120B, a temperature measuring resistor 120C, and an air temperature measuring resistor 120D, these resistors being all formed on a silicon substrate 110.

Also, the thermal air flow sensor 100A has a similar sectional structure as described above in connection with FIG. 2. More specifically, on the silicon substrate 110, there is formed an electrically insulating film 150 which comprises a silicon dioxide ($SiO_2$) layer 150A and a silicon nitride ($Si_3N_4$) layer 150B laminated in this order. On the silicon nitride layer 150B, there are formed the resistors 120 each comprising a semiconductor thin film in which polycrystalline silicon is mixed with a silicide compound and which contains an impurity doped therein. On the resistors 120, there is formed a protective film 160 which comprises a silicon dioxide ($SiO_2$) layer 160A and a silicon nitride ($Si_3N_4$) layer 160B laminated in this order.

Further, as described in connection with FIG. 4, the thermal air flow sensor 100A is mounted such that the silicon substrate 100 is fixed to a support 200 and a cavity 112 is positioned to face the support 200. The resistors 120 are exposed at their surfaces to air through the protective film 160.

The structure of the thermal air flow sensor 100A however differs from that described in connection with FIG. 4 in that end portions of leads 140 of the thermal air flow sensor 100A are directly connected respectively to a plurality of terminal electrodes 212 of a signal processing circuit 210 by wire bonding using lead wires 220, e.g., gold wires.

In this embodiment, the resistors 120 and the leads 140 each have a thickness of 0.5 $\mu$m by, and also have small specific resistance. Accordingly, wire bonding can be directly made on the leads with no need of the terminal electrodes 130 which are used in the embodiment shown in FIG. 4.

For example, where a platinum thin film is employed as the resistor, the platinum thin film is required to have a thickness as thin as about 0.1 $\mu$m in order to obtain a predetermined resistance value. Therefore, if wire bonding is directly made on a platinum lead, a problem such as peeling-off of the platinum thin film would rise in the connecting portion, and reliability of the wire bonding would deteriorate. By contrast, in this embodiment, the film thickness of each resistor 120 can be so increased that the reliability does not deteriorate due to direct wire bonding.

Also, where a film fabricated just by doping an impurity in polycrystalline silicon is employed as the resistor, the film has large specific resistance, and therefore terminal electrodes must be used which are made of aluminum or gold and hence have small specific resistance. By contrast, in this embodiment, since each of the resistors 120 and the leads 140 has small specific resistance, wire bonding can be directly made on the leads with no need of terminal electrodes.

Further, where aluminum is employed as a material of terminal electrodes, there arises a problem of corrosion of the terminal electrodes. By contrast, in this embodiment, since wire bonding is directly made on the leads without using terminal electrodes, it is possible to avoid the problem of corrosion.

With this embodiment, therefore, the step of fabricating the terminal electrodes is no longer required and the number of manufacturing steps can be cut down.

Next, the structure of a thermal air flow sensor according to a third embodiment of the present invention will be described with reference to FIGS. 7 and 8.

Figure 7:
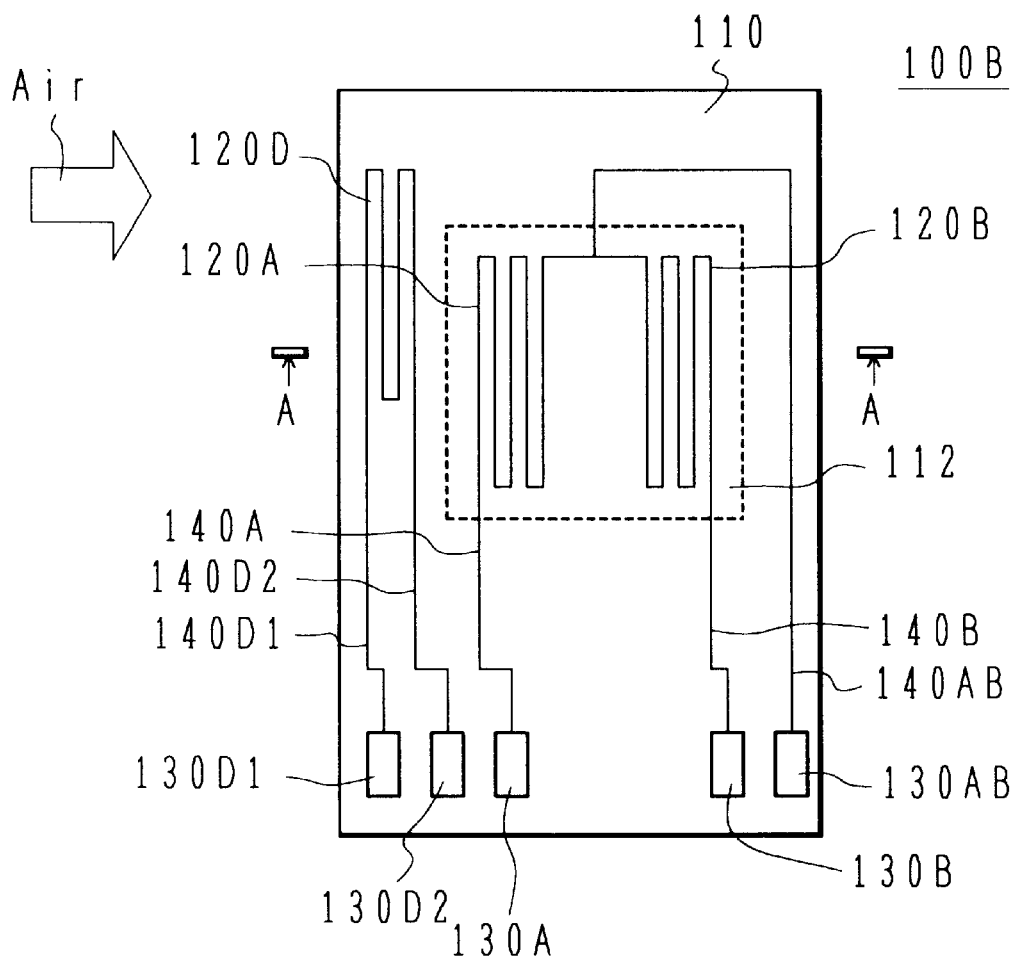
FIG. 7 is a plan view of a thermal air flow sensor according to a third embodiment of the present invention.
Figure 8:
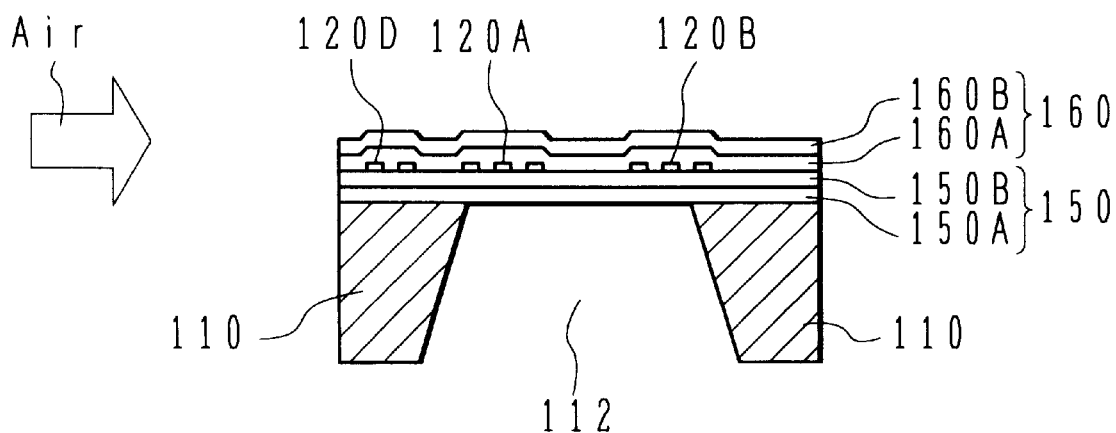
FIG. 8 is a sectional view taken along the line A—A of FIG. 7.

FIG. 7 is a plan view of a thermal air flow sensor according to the third embodiment of the present invention, and FIG. 8 is a sectional view taken along the line A—A of FIG. 7. Note that the same symbols as those in FIGS. 1 and 2 denote the same components.

As shown in FIG. 7, a thermal air flow sensor 100B according to this third embodiment comprises an upstream heat generating resistor 120A, a downstream heat generating resistor 120B, and an air temperature measuring resistor 120D, these resistors being all formed on a silicon substrate 110. The thermal air flow sensor 100B does not include the temperature measuring resistor 120C used in the first embodiment shown in FIG. 1, and the function of the temperature measuring resistor 120C for detecting a temperature defined by the heat generating resistors 120A, 120B is fulfilled by the upstream heat generating resistor 120A and the downstream heat generating resistor 120B themselves.

The upstream heat generating resistor 120A is disposed on the upstream side in the (forward) direction of an intake air stream Air, and the downstream heat generating resistor 120B is disposed downstream of the upstream heat generating resistor 120A. The air temperature measuring resistor 120D measures a temperature of intake air. The silicon substrate 110 has such a small size that the short side is about 2 mm and the long side is about 6 mm, for example, in an illustrated shape. As described later with reference to FIG. 8, the upstream heat generating resistor 120A and the downstream heat generating resistor 120B are formed above a cavity 112 which is formed in the silicon substrate 110.

Terminal electrodes 130A, 130AB, 130B, 130D1 and 130D2 are formed in an end portion of the silicon substrate 110. One end of the upstream heat generating resistor 120A is connected to the terminal electrode 130A through a lead 140A. A junction between the upstream heat generating resistor 120A and the downstream heat generating resistor 120B is connected to the terminal electrode 130AB through a lead 140AB. One end of the downstream heat generating resistor 120B is connected to the terminal electrode 130B through a lead 140B. Both ends of the air temperature measuring resistor 120D are connected to the terminal electrodes 130D1 and 130D2 through leads 140D1 and 140D2, respectively.

Here, the upstream heat generating resistor 120A, the downstream heat generating resistor 120B, and the air temperature measuring resistor 120D are each formed of a semiconductor thin film in which polycrystalline silicon (Poly-Si) is mixed with a silicide compound ($WSi_2$) of silicon (Si) and tungsten (W), and which contains phosphorous (P) doped therein as an impurity.

The upstream heat generating resistor 120A and the downstream heat generating resistor 120B are formed to have a film thickness of 0.5 $\mu$m, a line width of 100 $\mu$m, and a length of 1.1 mm. On these conditions, a sheet resistance value of 2 $\Omega/\square$ and a resistance value of 50$\Omega$ are resulted, and the resistance temperature coefficient can be increased to 2000 ppm/K. Also, the air temperature measuring resistor 120D is formed to have a film thickness of 0.5 $\mu$m, a line width of 10 $\mu$m, and a length of 2 mm. On these conditions, a sheet resistance value of 2 $\Omega/\square$ and a resistance value of 900$\Omega$ are resulted, and the resistance temperature coefficient can be increased to 2000 ppm/K.

By properly selecting a mixing ratio of a silicide compound to polycrystalline silicon and an impurity density, the heat generating resistors 120A, 120B can be each formed to have a sheet resistance value of 1 to 10 $\Omega/\square$, preferably 1 to 3 $\Omega/\square$, and a resistance value of 50$\Omega$ to several hundreds $\Omega$. On these conditions, the resistance temperature coefficient is set to be not less than 1200 ppm/K.

In addition to a silicide compound ($WSi_2$) of silicon (Si) and tungsten (W), the silicide compound may be any of a silicide compound ($MoSi_2$) of silicon (Si) and molybdenum (Mo), a silicide compound ($TaSi_2$) of silicon (Si) and tantalum (Ta), and a silicide compound ($TiSi_2$) of silicon (Si) and titanium (Ti).

Further, in addition to phosphorous (P), boron (B), arsenic (As) and antimony (Sb) are also usable as an impurity to be doped in the semiconductor thin film in which polycrystalline silicon is mixed with a silicide compound.

As with the resistor 120, the leads 140A, 140AB, 140B, 140D1 and 140D2 are each formed of a semiconductor thin film in which polycrystalline silicon is mixed with a silicide compound and which contains an impurity doped therein. Each lead 140 has a line width larger than (ten or more times as thick as) that of the resistor 120 so that its resistance value is small.

The principles of the thermal air flow sensor according to this embodiment for detecting a flow rate of intake air will now be described.

The upstream heat generating resistor 120A and the downstream heat generating resistor 120B are supplied with a heating current through the terminal electrodes 130A and 130B, and then generate heat. A temperature (Th) defined by the upstream heat generating resistor 120A and the downstream heat generating resistor 120B is detected by the upstream heat generating resistor 120A and the downstream heat generating resistor 120B themselves. On the other hand, a temperature (Ta) of intake air flowing into an intake passage is detected by the air temperature measuring resistor 120D. Then, the heating current supplied to the heat generating resistors 120A, 120B is controlled so that the temperature (Th) defined by the heat generating resistors 120A, 120B is held higher than the temperature (Ta) of the intake air by a predetermined temperature $\Delta$Th (e.g., 150° C.). An amount of heat taken away from the heat generating resistors 120A, 120B is proportional to a flow rate of intake air, and hence a value of the heating current supplied for heating the heat generating resistors 120A, 120B corresponds to the flow rate of the intake air. As a result, the flow rate of the intake air can be measured from the value of the heating current.

The principles of the thermal air flow sensor according to this embodiment for detecting the direction of the air stream Air are the same as described above in connection with FIG. 1. Specifically, the direction of the air stream can be detected by comparing a voltage across the upstream heat generating resistor 120A (i.e., a voltage between the terminal electrodes 130A and 130AB) with a voltage across the downstream heat generating resistor 120B (i.e., a voltage between the terminal electrodes 130B and 130AB), and then comparing temperatures (resistance values) of both the resistors with each other.

The sectional structure of the thermal air flow sensor 100B according to this embodiment will now be described with reference to FIG. 8. FIG. 8 shows a section taken along the line A—A of FIG. 7.

On the silicon substrate 110, there is formed an electrically insulating film 150 which comprises a silicon dioxide ($SiO_2$) layer 150A and a silicon nitride ($Si_3N_4$) layer 150B laminated in this order. By using the silicon nitride layer 150B which has a coefficient of thermal expansion slightly larger than that of the silicon substrate 110 and a high mechanical strength, thermal stress between the silicon substrate 110 and the electrically insulating film 150 can be reduced, thereby increasing the mechanical strength.

On the silicon nitride layer 150B, there are formed the resistors 120A, 120B and 120D each comprising, as described above, a semiconductor thin film in which polycrystalline silicon is mixed with a silicide compound and which contains an impurity doped therein.

On those resistors 120, there is formed a protective film 160 which comprises a silicon dioxide ($SiO_2$) layer 160A and a silicon nitride ($Si_3N_4$) layer 160B laminated in this order. The protective film 160 is formed to protect the resistors 120 against foreign matters, such as oil and water, contained in the intake air.

Further, a cavity 112 is formed in a central portion of the silicon substrate 110 to cover an area locating under the heat generating resistors 120A, 120B. The cavity 112 is formed by anisotropic etching of the silicon substrate 110 to such an extent that it reaches the boundary surface between the silicon substrate 110 and the electrically insulating film 150. Forming the cavity 112 provides such a structure that the heat generating resistors 120A, 120B are supported by the electrically insulating film 150 and the protective film 160, and are thermally insulated by the presence of the cavity 112. Comparing with the case that the cavity 112 is filled by the silicon substrate, therefore, the heat capacity of a sensor portion, which is made up of the heat generating resistors 120A, 120B and serves to measure a flow rate of intake air, can be reduced; hence response of the thermal air flow sensor can be improved.

The manufacturing process of the thermal air flow sensor according to this embodiment is similar to that described above in connection with FIG. 2. On the electrically insulating film 150, a semiconductor thin film, in which polycrystalline silicon is mixed with a silicide compound, is formed in a thickness of about 0.5 μm by the CVD process, for example. Further, phosphorus is doped as an impurity element in the semiconductor thin film by thermal diffusion or ion implantation. After that, a resist is formed in a predetermined shape by the known photolithography technique, and the semiconductor thin film is patterned by the process of reactive ion etching, for example. The resistors 120A, 120B and 120D are thereby formed. The other steps are the same as those described above in connection with FIG. 2.

As described above, this embodiment can also provide advantages below. By using polycrystalline silicon as a heat generating resistor, the existing semiconductor manufacturing process can be employed as it is. Also, by mixing a silicide compound in polycrystalline silicon, specific resistance of the heat generating resistor can be reduced. In addition, by doping an impurity to further reduce the specific resistance, detection sensitivity of the sensor can be improved.

Next, the structure of a thermal air flow sensor according to a fourth embodiment of the present invention will be described with reference to FIG. 9.

Figure 9:
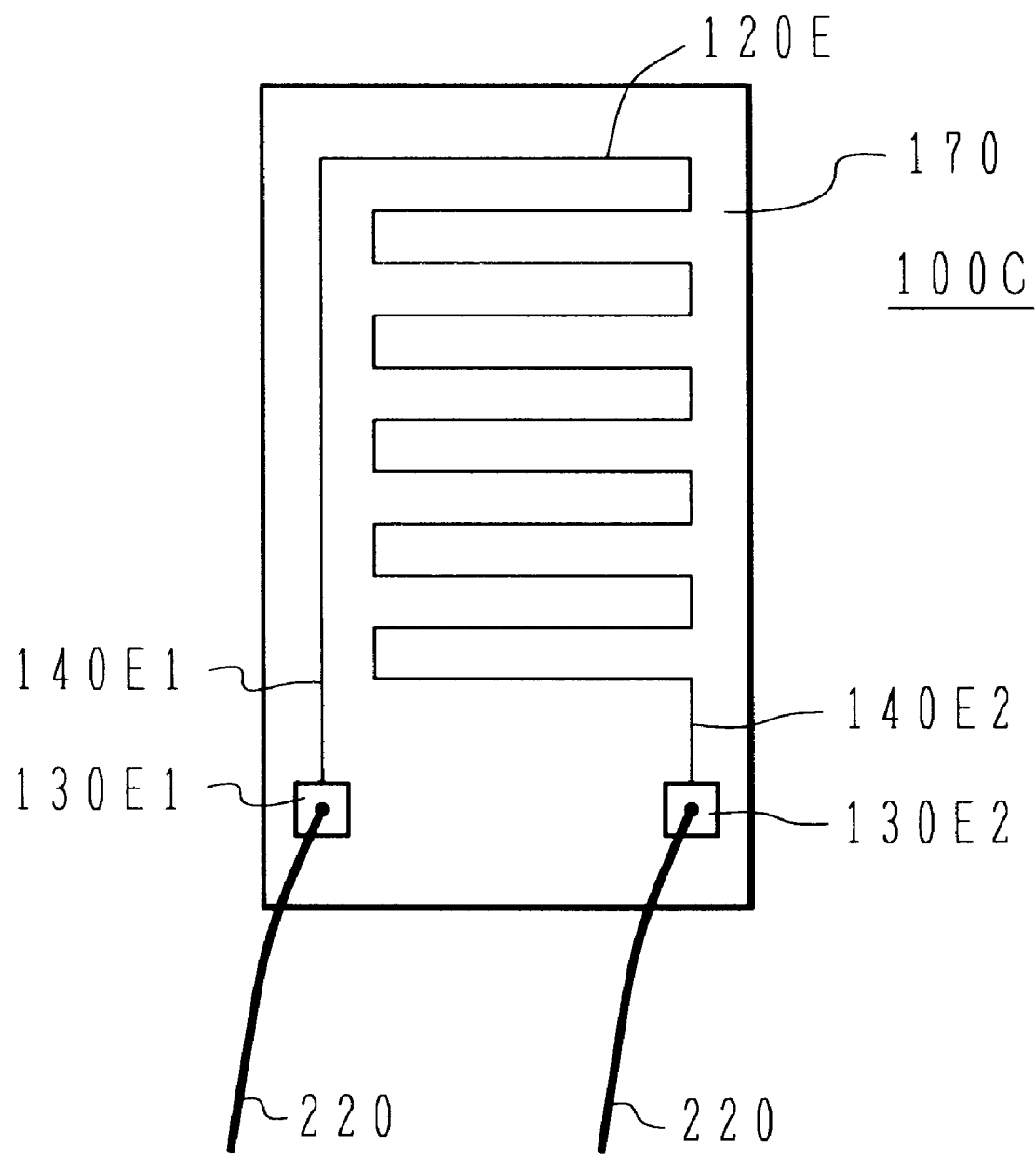
FIG. 9 is a plan view of a thermal air flow sensor according to a fourth embodiment of the present invention.

FIG. 9 is a plan view of the thermal air flow sensor according to the fourth embodiment of the present invention.

A thermal air flow sensor 100C according to this fourth embodiment employs an alumina ($Al_2O_3$) substrate 170 on which a heat generating resistor is formed.

A sensor comprising an alumina substrate, on which platinum (Pt) is formed as a heat generating resistor, is conventionally known. Such a sensor however has a problem that because platinum, gold or the like has a high thermal conductivity, heat loss occurs through leads connected to the heat generating resistor and lead wires connected to the leads by wire bonding, thus resulting in poor accuracy.

In this embodiment, a heat generating resistor 120E is formed on the alumina substrate 170. Both ends of the heat generating resistor 120E are connected respectively to terminal electrodes 130E1, 130E2 through leads 140E1, 140E2. The terminal electrodes 130E1, 130E2 are connected respectively to a plurality of terminal electrodes of a signal processing circuit (not shown) by wire bonding using lead wires 220, e.g., gold wires. The alumina substrate 170 has such a relatively large size that the short side is about 10 mm and the long side is about 20 mm, for example, in an illustrated shape.

The heat generating resistor 120E is formed of a semiconductor thin film in which polycrystalline silicon (Poly-Si) is mixed with a silicide compound ($WSi_2$) of silicon (Si) and tungsten (W), and which contains phosphorous (P) doped therein as an impurity. By using, as the heat generating resistor 120E, a semiconductor thin film in which polycrystalline silicon is mixed with a silicide compound, specific resistance of the resistor can be reduced to become smaller than that resulted when using polycrystalline silicon alone, while a reduction in resistance temperature coefficient thereof can be held down. To further reduce the specific resistance, phosphorous is doped as an impurity in the semiconductor thin film in which polycrystalline silicon is mixed with a silicide compound. However, an increase in impurity density lowers not only the specific resistance, but also the resistance temperature coefficient. Accordingly, the impurity density is adjusted depending on required values of the specific resistance and the resistance temperature coefficient.

By properly selecting a mixing ratio of a silicide compound to polycrystalline silicon and an impurity density, the heat generating resistor 120E can be formed to have a sheet resistance value of 1 to 10 Ω/□, preferably 1 to 3 Ω/□, and a resistance value of 50Ω to several hundreds Ω. On these conditions, the resistance temperature coefficient is set to be not less than 1200 ppm/K.

In addition to a silicide compound ($WSi_2$) of silicon (Si) and tungsten (W), the silicide compound maybe any of a silicide compound ($MoSi_2$) of silicon (Si) and molybdenum (Mo), a silicide compound ($TaSi_2$) of silicon (Si) and tantalum (Ta), and a silicide compound ($TiSi_2$) of silicon (Si) and titanium (Ti).

Further, in addition to phosphorous (P), boron (B), arsenic (As) and antimony (Sb) are also usable as an impurity to be doped in the semiconductor thin film in which polycrystalline silicon is mixed with a silicide compound.

As with the resistor 120E, the leads 140E1 and 140E2 are each formed of a semiconductor thin film in which polycrystalline silicon is mixed with a silicide compound and which contains an impurity doped therein. Each lead 140 has a line width larger than (ten or more times as thick as) that of the resistor 120E so that its resistance value is small.

While the foregoing description has been made on a heat generating resistor, a temperature measuring resistor can also be formed as with the heat generating resistor 120E by doping an impurity in a semiconductor thin film in which polycrystalline silicon is mixed with a silicide compound.

Thus, by using a semiconductor thin film in which polycrystalline silicon is mixed with a silicide compound and which contains an impurity doped therein, the heat generating resistor can be formed to have a smaller thermal conductivity than platinum and gold. It is hence possible to reduce heat loss through the leads connected to the heat generating resistor and the lead wires connected to the leads by wire bonding, thus resulting in improved accuracy.

According to the embodiments, as described above, detection sensitivity can be improved while allowing polycrystalline silicon to be used as a heat generating resistor.

What is claimed is:

1. A thermal air flow sensor, comprising a substrate, and a heat generating resistor formed on said substrate, wherein said heat generating resistor is formed of a material of semiconductor thin film in which polycrystalline silicon is mixed with a silicide compound.

2. A thermal air flow sensor according to claim 1, wherein said silicide compound contains a metal selected from the group consisting of at least one of molybdenum (Mo), tantalum (Ta), tungsten (W) and titanium (Ti).

3. A thermal air flow sensor according to claim 1, wherein said semiconductor thin film contains an impurity element doped therein.

4. A thermal air flow sensor according to claim 3, wherein an impurity is doped in said semiconductor thin film so that said semiconductor thin film has a resistance temperature coefficient of not less than 1200 ppm/K and specific resistance of 1 to 10 Ω/□ in terms of sheet resistance.

5. A thermal air flow sensor according to claim 1, wherein lead wires are directly connected by wire bonding to leads which are connected to said heat generating resistor and are made of the material forming said heat generating resistor.

6. A thin film resistor for use as a heat generator in a thermal air flow sensor, wherein said thin film resistor is a mixture of polycrystalline silicon and a silicide compound.

7. A thin film resistor according to claim 6, wherein said silicide compound contains a metal selected from the group consisting of at least one of molybdenum (Mo), tantalum (Ta), tungsten (W) and titanium (Ti).

8. A thin film resistor according to claim 6, wherein said semiconductor thin film contains an impurity element doped therein.

9. A thermal air flow sensor comprising: a thin film resistor formed of a semiconductor thin film comprised of polycrystalline silicon mixed with a silicon compound, a silicon dioxide layer covering said thin film resistor, and a silicon nitride layer coated on said silicon dioxide layer, said thin film resistor giving off heat into a fluid, that is a target of measurement, through said silicon dioxide layer and said silicon nitride layer.

* * * * *